United States Patent
Hagen et al.

(10) Patent No.: US 8,181,844 B2
(45) Date of Patent: *May 22, 2012

(54) METHOD FOR THE PERMANENT CONNECTION OF TWO COMPONENTS BY MEANS OF GLASS OR METAL SOLDER

(75) Inventors: Jan Hagen, Freiburg (DE); Thorsten Faber, Freiburg (DE); Rainer Kubler, Freiburg (DE); Gunter Kleer, Buchenbach (DE)

(73) Assignee: Fraunhofer Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,998

(22) Filed: Feb. 24, 2011

(65) Prior Publication Data

US 2011/0139857 A1 Jun. 16, 2011

Related U.S. Application Data

(63) Continuation of application No. 12/666,310, filed as application No. PCT/DE2008/001049 on Jun. 23, 2008, now Pat. No. 7,926,695.

(30) Foreign Application Priority Data

Jun. 23, 2007 (DE) .......................... 10 2007 029 031

(51) Int. Cl.
*B23K 31/02* (2006.01)
(52) U.S. Cl. ..................................... 228/121; 228/122.1
(58) Field of Classification Search .......................... None
See application file for complete search history.

(56) References Cited

U.S. PATENT DOCUMENTS

| | | | |
|---|---|---|---|
| 3,413,711 A | 12/1968 | Brewer et al. | |
| 3,515,574 A | 6/1970 | Montgomery | |
| 3,549,337 A | 12/1970 | Palmer | |
| 4,420,110 A | 12/1983 | McCullough et al. | |
| 4,562,121 A * | 12/1985 | Thiemann et al. | 428/607 |

(Continued)

FOREIGN PATENT DOCUMENTS

DE 34 85 859 T2 12/1984

(Continued)

OTHER PUBLICATIONS

"Gmelins Handbuch der anorganischen Chemie", 1962, Verlag Chemie, Weinheim, XP002500565, Chrom, Teil A., Lieferung 1, Seite 230.

*Primary Examiner* — Kiley Stoner
(74) *Attorney, Agent, or Firm* — Antonelli, Terry, Stout & Kraus, LLP.

(57) ABSTRACT

The invention is a method for permanent connection of two components by soldering employing a glass or metal solder as the solder material. A layer system providing adhesion is applied to both components, between which the solder material is introduced. the layer system is heated to a soldering temperature characteristic for the solder material and results in a permanent solder connection between both components after cooling. The layer system providing adhesion has an adhesive layer applicable directly to the component and a solderable layer. The adhesive layer, if a glass solder is used, contains oxidic, carbidic, or nitridic components or mixed compounds thereof and, if a metal solder is used, the adhesive layer contains carbidic or nitridic components or mixed compounds thereof.

8 Claims, 9 Drawing Sheets

U.S. PATENT DOCUMENTS

| | | | |
|---|---|---|---|
| 4,610,934 A | 9/1986 | Boecker et al. | |
| 4,624,404 A | 11/1986 | Ohmae et al. | |
| 4,645,121 A | 2/1987 | Devine, Jr. | |
| 4,700,882 A | 10/1987 | Devine, Jr. | |
| 4,769,525 A | 9/1988 | Leatham | |
| 4,854,495 A * | 8/1989 | Yamamoto et al. | 228/124.1 |
| 4,871,108 A | 10/1989 | Boecker et al. | |
| 4,872,606 A * | 10/1989 | Satoh et al. | 228/121 |
| 5,043,229 A | 8/1991 | Mizuhara | |
| 5,096,749 A | 3/1992 | Harada et al. | |
| 5,134,044 A | 7/1992 | Megerle | |
| 5,213,877 A | 5/1993 | Yoshida et al. | |
| 5,294,241 A | 3/1994 | Taylor et al. | |
| 5,804,321 A | 9/1998 | Thorpe et al. | |
| 5,807,626 A | 9/1998 | Naba | |
| 6,020,076 A | 2/2000 | Fujii et al. | |
| 6,187,114 B1 * | 2/2001 | Ogashiwa et al. | 148/400 |
| 6,261,703 B1 | 7/2001 | Sasaki et al. | |
| 6,392,824 B1 | 5/2002 | Holderer et al. | |
| 2002/0038813 A1 | 4/2002 | Shinkai | |
| 2002/0109152 A1 | 8/2002 | Kobayashi et al. | |
| 2002/0125300 A1 | 9/2002 | Ishikawa et al. | |
| 2003/0035975 A1 | 2/2003 | Shinkai et al. | |
| 2003/0066865 A1 | 4/2003 | Tsukaguchi et al. | |
| 2003/0141345 A1 | 7/2003 | Shinkai et al. | |
| 2004/0074951 A1 | 4/2004 | Takahashi et al. | |
| 2004/0126612 A1 | 7/2004 | Shinkai et al. | |
| 2004/0262367 A1 | 12/2004 | Nakamura | |
| 2005/0079343 A1 | 4/2005 | Raybould et al. | |
| 2005/0218426 A1 | 10/2005 | Kobayashi et al. | |
| 2007/0119907 A1 * | 5/2007 | Rodhammer | 228/122.1 |
| 2008/0304959 A1 * | 12/2008 | Benoit et al. | 415/200 |
| 2009/0152539 A1 | 6/2009 | Yamazaki et al. | |
| 2010/0155456 A1 | 6/2010 | Hougham et al. | |

FOREIGN PATENT DOCUMENTS

| | | |
|---|---|---|
| DE | 10 2005 028 704 A1 | 12/2006 |
| DE | 10 2005 024 512 B3 | 2/2007 |

\* cited by examiner

METHOD FOR THE PERMANENT CONNECTION OF TWO COMPONENTS BY MEANS OF GLASS OR METAL SOLDER

CROSS REFERENCE TO RELATED APPLICATION

This application is a Continuation of U.S. Ser. No. 12/666,310, filed Dec. 23, 2009 (now U.S. Pat. No. 7,926,695), which is a U.S. national phase application under 35 U.S.C. §371 of international application no. PCT/DE2008/001049, filed Jun. 23, 2008, and which claims priority of German Application DE 10 2007 029 031.6, filed Jun. 23, 2007, which applications are incorporated by reference.

BACKGROUND OF THE INVENTION

1. Field of the Invention

The invention relates to a method for the permanent connection of two components, of which at least one component comprises an electrically nonconductive material, by soldering employing a glass or metal solder as the solder material, in which a layer system providing adhesion is applied to at least one of the two components, onto which the solder material is applied, which is brought indirectly or directly into contact with the other components and is heated to a soldering temperature characteristic for the solder material and results in a permanent soldered connection between both components after cooling.

2. Description of the Prior Art

For manifold applications, for example, in the field of optics or measuring technology, permanent connections must be produced between components made of different or similar materials, such as glass to glass or glass to metal, on which various demands are made. For example, connections of this type must be mechanically robust and resistant to external environmental influences, such as electromagnetic radiation, moisture, and temperature, to name only a few. In order to meet these demands, soldered connections have proven to be particularly suitable in order to connect two components permanently to one another, of which at least one component comprises an electrically nonconductive material, preferably a glass-like material such as quartz glass, float glass, for example, single-pane safety glass, composite safety glass, and partially tempered safety glass, or a ceramic material. For this purpose, metal solder materials or glass solders which are known per se are melted and applied to the surfaces of the components to be connected to one another, in order to be used as an adhesive and binding layer between the two components. However, it has been shown that the known solder materials only inadequately wet the surfaces of electrically nonconductive materials in particular and also many metal materials. That is, they do not form an adhesion-stable surface connection to the components, so that the surfaces of the components to be joined with one another must first be coated using a solderable layer which forms a sufficient adhesive connection to the particular surface of the components. For this purpose, layer systems which comprise at least three layer components are frequently used, which are applied to the surface of the particular components to be connected for reasons of improved adhesive capability and simultaneously improved soldering properties. The typical three-layered layer systems comprise an adhesive layer to be applied directly to the component surface(s), a solderable layer to be applied thereon, and finally an oxidation protective layer to be applied to the solderable layer.

The layer sequence is typically produced in the course of sputtering methods or galvanic deposition methods which are preferably performed in the context of a pretreatment, in which the multicomponent layer system is applied to each of the surfaces of the components to be joined to one another. Finally, the solder material is applied between the coated join surfaces, which results in an adhesion-stable soldered connection between the two components through heating to a temperature characteristic for the particular solder material which is the so-called melting temperature, and subsequent cooling. Depending on the type of material of the components to be joined to one another, metal solders or glass solders are used as the solder material.

Thus, for example, a soldering method for optical materials on metal frames is disclosed in EP 0 901 992 A2, in which an adhesive layer comprising CrAl or TiW is applied at least to the surface of the component comprising the optical material which is preferably quartz glass, onto which a diffusion barrier layer in the form of pure nickel is sputtered. In addition, a gold layer, used as an oxidation protective layer, is applied to the layer composite. The surface of the metal frame, in contrast, is only provided with a wetting auxiliary layer comprising nickel or copper, on which the solder material which is tin or an indium alloy, is applied. The soldering material melts at soldering temperatures below 300° C. and which forms an intimate soldered connection with excellent adhesive strength to the layer system applied to the glass material after corresponding cooling.

A method for producing window elements which are solderable to provide a hermetic sealed in a housing may be inferred from DE 10 005 024 512 B3. An aluminum layer and/or titanium or a titanium alloy is applied as the adhesive layer. In the described method, platinum, iron/nickel, nickel, or palladium, which is coated by an oxidation protective layer comprising gold, is used as the solderable layer.

A method for connecting an optical glass fiber to a metal mount in the course of a soldered connection is described in US Published Application 2003/0174999 A1. The glass fiber is provided with a layer system which primarily has an adhesive layer, which comprises WTi, CrAu, Cr, NiCr, onto which a solderable layer is applied, comprising nickel or platinum, which is finally coated using a gold oxidation protective layer.

A fluxless soldering method for connecting a glass part to a metal part may be inferred from DE 692 18 004 T2. A layer system is applied to the glass part, which has titanium as the adhesive layer, nickel as the solderable layer, and a nickel-boron alloy or gold as the oxidation protective layer.

A method for connecting ceramic and metal bodies may be inferred from DE 34 85 859 T2. A compound made of an oxide and a metal is applied to the surface of the ceramic body using spray coating or ion plating as the adhesive layer, which forms a metallurgical connection to the ceramic body in the course of the heating. The joining to the metal body is subsequently performed using hard soldering.

A semiconductor part having semiconductor part components embedded in plastic housing compound may be inferred from DE 10 2005 028 704 A1. The semiconductor part components are joined to the plastic housing using an adhesive layer without further addition of a solder material and the adhesive layer has nanoscale surface structuring, by which the joining to the particular joint partner is ensured using a positive connection.

If adhesive layers which comprise metal are used, as is entirely the case in the above-mentioned cited art, the disadvantage is that the thermal expansion coefficients of the metal layer and the material to which the components are to be joined typically differ strongly. In addition, the adhesive strength of metal layers on electrically nonconductive substrate surfaces, such as glass-like or crystalline materials, is frequently significantly less than on metal substrate surfaces. These factors may result in the formation of high transient mechanical internal tensions within the layer composite or the substrate surface upon heating of the soldering composite, such as tensile or compressive stress, which already result in cracking in the layer or in the substrate material or the detachment of the particular adhesive layer from the substrate surface during soldering in the worst case. Strongly pronounced mechanical internal tensions may also occur in the interface between the solder material and the applied layer system upon cooling of the solder, which may result in layer failure. It is obvious that the strength of the solder composite is reduced by internal tensions inherent to the layer and in the worst case can already result in failure of the solder composite upon the action of slight mechanical strains.

A further disadvantage of adhesive layers comprising metals is that as a consequence of the comparatively high reflection values for IR radiation, the metal layers represent a heat barrier. It becomes more difficult to introduce the heat required for melting the solder material efficiently into the solder material, and/or higher heating powers are required, which may result in higher thermal strains of the participating components and/or longer processing times.

SUMMARY OF THE INVENTION

The invention is a method for the permanent connection of two components, of which at least one component comprises an electrically nonconductive material, preferably a glass-like material, by soldering using a glass or metal solder as a solder material. A layer system providing adhesion is applied to at least one of the two components, to which the solder material is applied, which is brought indirectly or directly into contact with the other component and heated to a soldering temperature characteristic for the solder material. A permanent soldered connection results between both components after cooling so that measures are to be taken in order to entirely or at least largely avoid the mechanical internal tensions occurring in previously known soldered connections, in order to provide a permanent and loadable join connection between the components. In addition to the aspect of improving the adhesive capability between the solder connection implemented by heating and the surfaces of the particular components to be joined to one another, the thermal conductivity of the layer system providing adhesion is also to be improved for the purposes of melting the solder material applied to the at least one layer system which forms as rapidly and homogeneously as possible upon thermal heat introduction.

The method in a layer system provides adhesion with an adhesive layer applicable directly to the surface of the particular component and a solderable layer, in which the adhesive layer, if a glass solder is used as the solderable layer, contains oxidic, carbidic, or nitridic components and/or mixed compounds of the components of this type, and, if a metal solder is used as the solderable layer, it contains carbidic or nitridic components and/or mixed compounds of the components of this type.

Through the renunciation according to the invention of the use up to this point of elementary and/or alloyed metals in favor of oxidic, carbidic, or nitridic components or the mixed compounds thereof, which may advantageously also be supplemented with further heteroatoms, for example, halogenides, a much greater breadth of variance of possible adhesive layers is obtained. Their material properties may be selected and/or adapted regarding mechanical internal tensions, high adhesive strengths to both electrically nonconductive and also metal substrates, and also individually in regard to the particular thermal conduction properties of the particular material properties of the components and solder materials to be connected to one another.

Multiple possibilities thus open up for the material finishing of a material compound coming into consideration for the adhesive layer. In addition to the targeted selection of a material from the above material groups listed according to the, it is also possible to perform a gradual material distribution of a material or a material group within a selected material composition having increasing adhesive layer thickness. A multilayered construction in which individual layers in direct sequence each comprise different material compositions is also conceivable in this context.

In addition to an adhesive strength to the surface of one of the components to be joined which is settable optimally by the material variation capability, with suitable material selection, optimization of the adhesive strength to the solderable layer to be applied to the adhesive layer is also achievable.

To illustrate the material chemical composition of the adhesive layer coming into consideration according to the invention upon use of a glass solder, reference is made to the following formula:

$$\mathrm{Me}(C_a N_b O_c S_d X_e)$$

In the above general formula, Me is representative of a metal or a metal compound in which at least one metal element from the group of lanthanides or the groups 3, 4, 5, 6, 7, 8, 13, 14 of the periodic system is selected, preferably Me=Ce, Y, Ti, Zr, V, Ta, Cr, Mo, W, Fe, Co, Ni, Al, Si and combinations of a plurality of the above metal elements. Further, the numeric indices a, b, c, d, e are positive variables, at least one of which is a numeric parameter not equal to 0. X is representative for substances from the material group of the halogens, in particular F, Cl, Br.

It can be seen on the basis of the above formula representing the material composition of the adhesive layer what a great number of possible material compositions come into consideration for the adhesive layer. As previously noted, individual or multiple numeric indices which each characterize the material proportion of a chemical substance of the material determining the adhesive layer may also be varied gradually, for example, with increasing adhesive layer thickness or in stepped layer sequence.

In a particularly advantageous way, the adhesive layer may be applied over part or all of the surface of one component to be joined in the course of a CVD or PVD vacuum coating method or also in the course of a galvanic deposition method. Of course, further material deposition methods are also available for the application of the adhesive layer and also the further layers, which are discussed hereafter, such as sputtering, metal epitaxy methods, or wet chemistry methods.

The solderable layer is deposited on the adhesive layer applied to the surface of one component, which, in the case of a metal solder, comprises at least one of the following elementary metals or combinations of a plurality of these metals: Ni, Cu, Ti, Zr, Fe, Pd, Ni, Cr, Au, Sn, Pd.

The deposition of the adhesive layer and the solderable layer to be applied thereon is primarily used as the basis for an intimate material connection to a solder material connecting both components to one another, for example, in the form of a glass or metal solder, which is applied separately on the layer system described above and is correspondingly caused to melt.

In order to prevent the surface of the solderable layer from oxidizing in the presence of air/oxygen, for example, whereby the affinity of the solderable layer to the material reaction with the solder material is impaired, an oxidation protective layer made of a noble metal, in particular Re, Ru, Os, Rh, Ir, Pd, Pt, Ag, Au or combinations of a plurality of these metals is preferably applied to the solderable layer. The noble metals do not impair the material enclosure between the solder material and the solderable layer lying directly below the oxidation protective layer in any way.

To provide the condition that the solder material to be introduced between both components to be introduced forms a permanent and stable soldered connection to the surfaces of the components, the surfaces of both components are preferably provided with a layer system adapted appropriately to the material of the components, at least comprising the adhesive layer having a thickness of at least 10 nm to approximately 200 nm and the solderable layer and preferably additionally the oxidation protective layer in the case of the metal solder. For this purpose, the adhesive layer and the solderable layer preferably have layer thicknesses of at least 10 nm, so that the condition for a permanent soldered connection can be ensured, on the one hand, but the material use required for implementing the layer system is kept as low as possible for purely economic reasons, on the other hand.

A solder material, for example, in the form of glass or metal solder, is introduced in each case between the layer systems applied to the surfaces of both components to produce the solder composite, which is caused to melt with or without an additional flux in the course of thermal energy introduction. Depending on the material composition of the components to be connected to one another, multiple possibilities are available for heating the solder material, for example, by bringing at least one part of the solder composite into contact with a heating plate, introducing the solder composite and the components into a furnace, targeted application of thermal radiation with the aid of a thermal radiator, a microwave source, or a laser, ultrasound welding, friction welding, or application of inductive heating until the solder material is in molten form and forms an intimate material connection, which solidifies strongly after subsequent cooling, with the layer system, which is also softened or liquefied.

BRIEF DESCRIPTION OF THE DRAWINGS

The invention is described for exemplary purposes hereafter without restriction of the general idea of the invention on the basis of exemplary embodiments with reference to the drawings. In the figures.

DETAILED DESCRIPTION OF THE EMBODIMENTS

Figure 1:
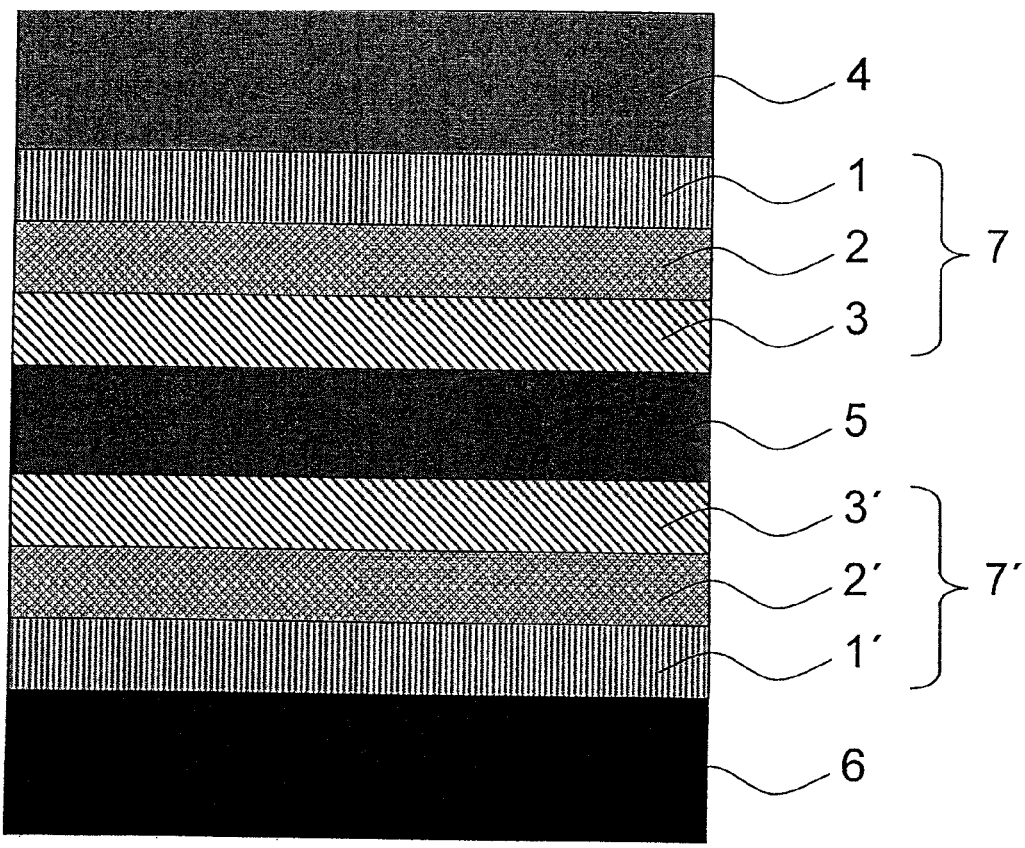
FIG. 1 shows a schematic illustration of the layer system according to the invention for the permanent connection of two components.

FIG. 1 shows the layer sequence of a soldered connection for the permanent connection of two components 4, 6, of which at least one component comprises an electrically non-conductive material, preferably a glass-like material, such as quartz glass or a ceramic. The soldered connection described hereafter is thus suitable for producing a permanent connection between a glass component and a metal component and between two glass components or similar electrically non-conductive components. Layer systems 7, 7', each comprising three layers, which are composed of an adhesive layer 1, 1', a solderable layer 2, 2', and an oxidation protective layer 3, 3' if a metal solder is used, are located on the surfaces of the components 4, 6 to be connected to one another. The adhesive layers 1, 1', which comprise oxidic, carbidic, and/or nitridic components or mixed compounds thereof, are each selected in regard to their material selection so that they have the best possible wetting and/or adhesion, and thus form the best possible connection directly to the surface of the particular components 4, 6. The following material compounds are to be listed as particularly suitable material compounds for adhesive layers in the case of a glass solder:

$Y_2O_3$, $TiN$, $TiO_2$, $ZrO_xN_y$, $VC$, $V_2O_5$, $TaC$, $CrN$, $Cr_2O_3$, $WC$, $WN_x$, $Fe_3C$, $Ni_3C$, $AlN$, $Si_3N_4$, $LaF_3$, $AlF_3$, $AlCl_3$.

To produce an intimate soldered connection, solder material 5, preferably in the form of glass or metal solder, is introduced between both layer systems 7, 7', which is intentionally caused to melt. An intimate soldered connection results between both components 4, 6 after cooling of the solder material.

With the aid of the solder connection according to the invention, it may be shown that a frame made of stainless steel can be permanently soldered to a float glass pane. For this purpose, an approximately 200 nm thick adhesive layer made of TiCN is sputtered in the course of PVD vacuum coating on the surface of the stainless steel frame to be joined to the glass pane. This is performed using reactive sputtering of a titanium target with the addition of nitrogen and methane as reactive gases inside a PVD coating facility. Subsequently, a titanium intermediate layer is applied to each of the adhesive layers, followed by a solderable nickel layer. Finally, a 100 nm thick gold layer is applied as the oxidation protective layer. AgSn solder material is applied in paste form to the particular coated area of the float glass pane and subsequently the stainless steel frame is laid flush with the coated top side. The composite made of float glass pane, solder paste, and frame is heated in a furnace to approximately 300° C. and subsequently cooled slowly to room temperature, so that a nearly tension-free permanent solder connection forms between both components.

Figure 2:
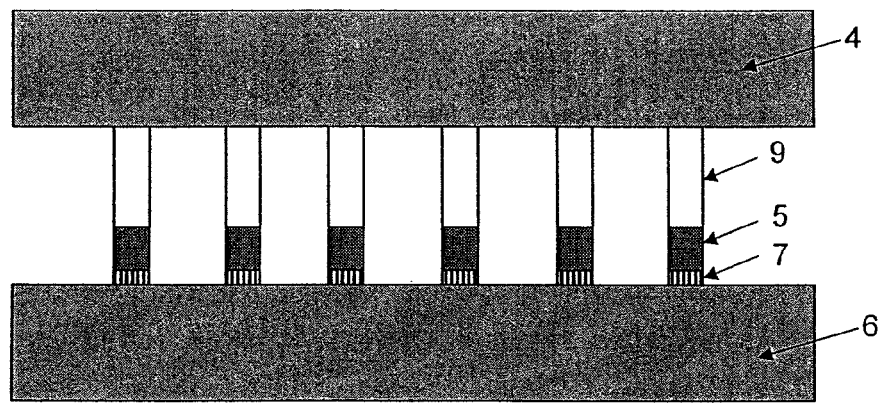
FIGS. 2 through 15 show exemplary applications for the soldered connection according to the invention.

FIG. 2 shows a cross-sectional view through two glass panes 4, 6 joined to one another via metal or glass-like spacers 9. It is assumed that the upper glass pane 4 rests loosely on the spacers 9 or is glued fixedly thereto. The particular lower ends of the spacers 9 are fixedly connected via a solder composite system of the type explained above to the lower pane 6. A metal solder 5 is thus provided directly at the head-side ends of the spacers 9, which adjoins the layer system 7, which in turn provides an adhesive layer applied to the lower glass pane 6, a solderable layer deposited thereon, and an oxidation protective layer. The two panes 4 and 6 are spaced apart by the spacers 9.

Figure 3:
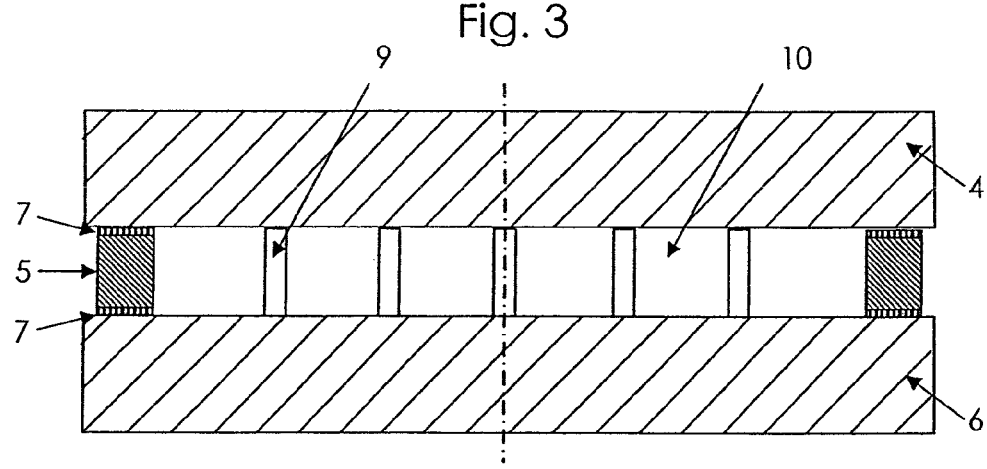

FIG. 3 shows a cross-sectional view through two glass panes 4, 6 spaced apart from one another via metal or glass-like spacers 9. At the edge area of the glass panes 4, 6, they are joined fixedly gas-tight using a solder composite according to the solution. For this purpose, the surfaces of the edge areas of both glass panes are each provided with the layer system 7 of the type described above, between which solder material 5 is introduced, which results in a gas-tight composite after a corresponding heating and subsequent cooling, so that it is possible to permanently preserve vacuum conditions in the volume 10, which is enclosed by both glass panes.

Figure 4:
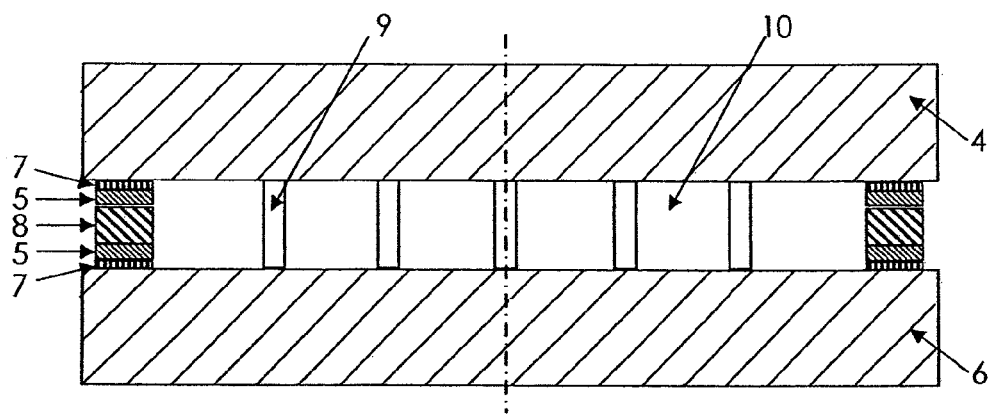

FIG. 4 shows a cross-sectional view comparable to the above exemplary embodiment, except a metal frame 8 is introduced centrally between the solder composite. The layer system 7 is provided on both sides of the metal frame 8 above solder material 5, which also terminates the inner volume 10 to be gas-tight, in order to permanently preserve vacuum conditions in the interior in this way. Reference is made to the meaning of the reference signs already described and shown in FIG. 4 and also to the above explanations hereafter to avoid repetitions.

Figure 5:
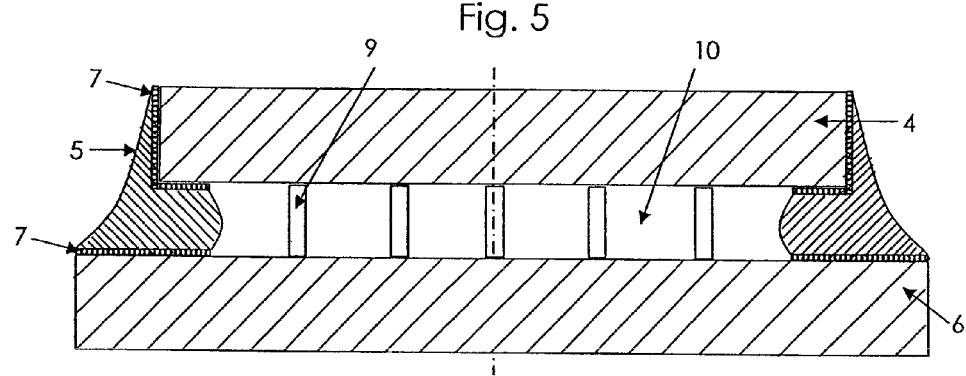

FIG. 5 shows a cross-sectional view between two glass panes 4, 6 of different dimensions, on whose edge areas layer systems 7 are applied in the form as shown, between which solder material 5 is introduced. The two panes 1 and 2 are spaced apart by spacers 9 with the space 10 between the panes 4 and 6 being evacuated.

Figure 6:
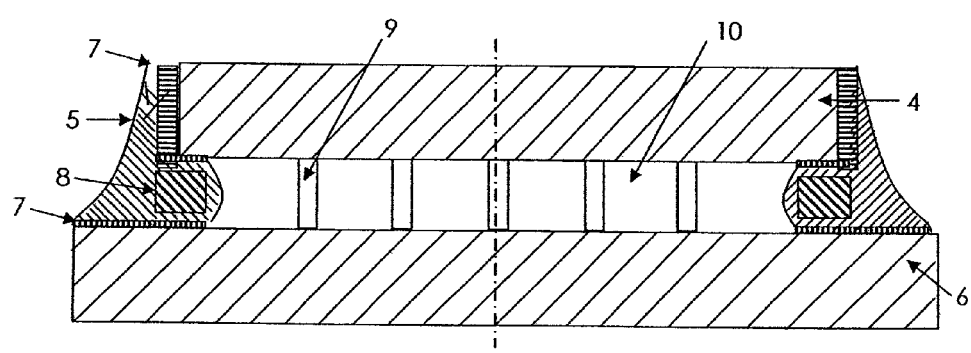

FIG. 6 shows the exemplary embodiment according to FIG. 5, with the addition of a metal frame 8 integrated inside the solder material 5 which is preferably made of stainless steel.

Figure 7:
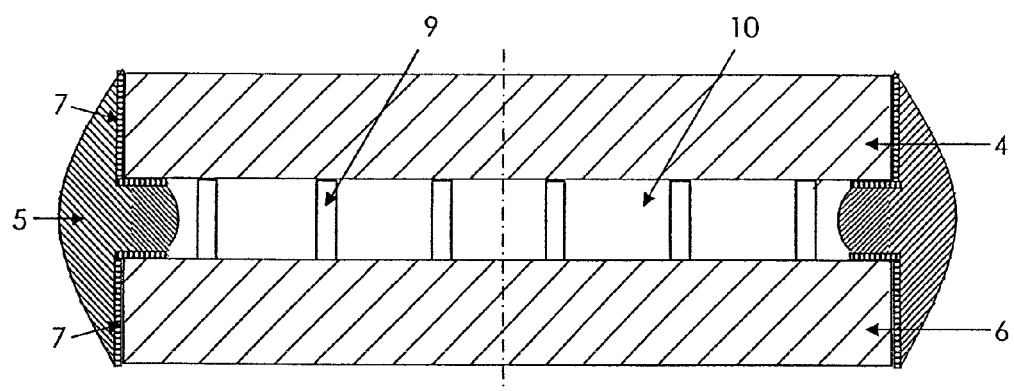

FIG. 7 shows a cross-sectional view of two glass panes 4, 6, which are spaced apart by spacers 9 and on whose edge areas the layer system 7 according to the invention is applied enclosing the angle as illustrated. In the edge and abutting areas of the panes 4 and 6, both panes 4, 6 are filled up with solder material 5 externally like a bead, which represents a permanent, loadable, and gas-tight solder connection together with the layer system 7.

Figure 8:
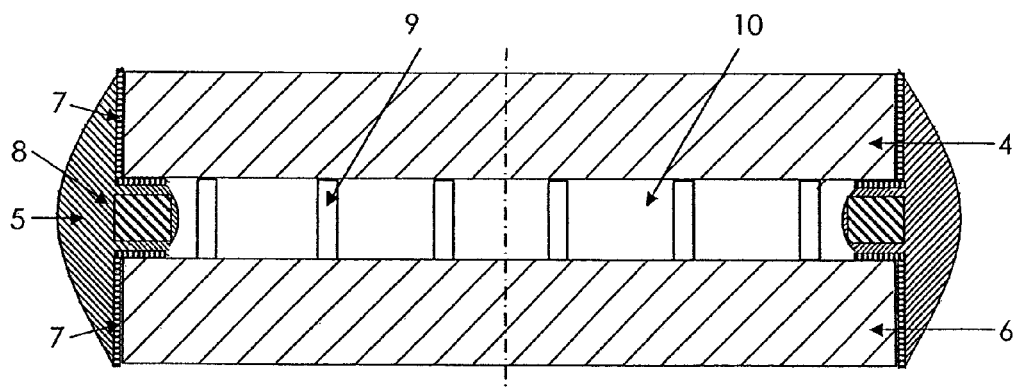

FIG. 8 shows the exemplary embodiment according to FIG. 7, with the addition of a metal frame 8 which preferably is made of stainless steel, integrated within the solder material 5.

Figure 9:
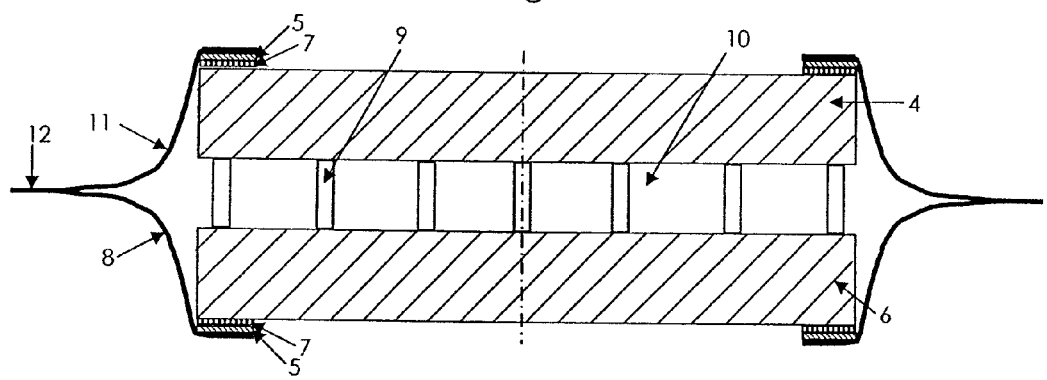

FIG. 9 shows a cross-sectional view of two glass panes 4, 6, which are spaced apart by spacers 9 with metal films 11 being applied to be vacuum-tight in the edge and/or abutting areas of the outer sides of the two panes 4 and 6 via layer systems 7 using the metal solder material 5. The two films 11 are welded vacuum-tight to one another and form a welded connection 12. The two panes 4 and 6 are spaced apart by spacers 9 with the space 10 between the panes 4 and 6 being evacuated.

Figure 10:
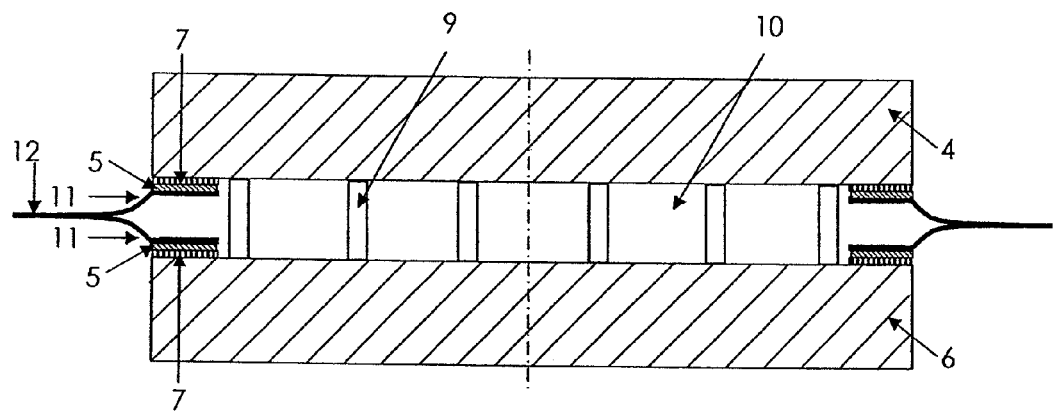

FIG. 10 shows a cross-sectional view comparable to that in FIG. 9, with the metal films 11 being applied to be vacuum-tight in the edge and/or abutting areas of the inner sides of the two panes 4 and 6 via the layer systems 7 using the metal solder material 5. The two films 11 are welded to be vacuum-tight to one another and each form a welded connection 12. The two panes 4 and 6 are spaced apart by spacers 9 with the space 10 between the panes 4 and 6 being evacuated.

Figure 11:
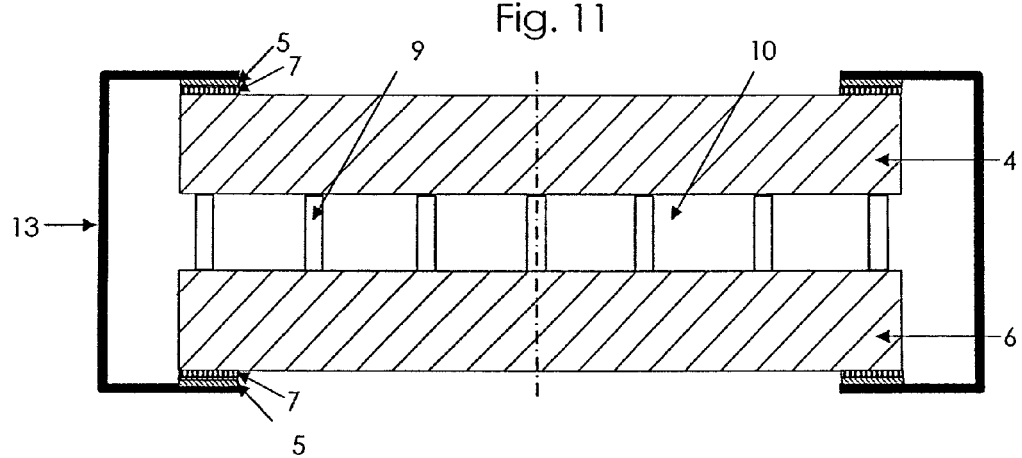

FIG. 11 shows a cross-sectional view of two glass panes 4, 6, which are spaced apart by spacers 9, a metal frame 13, which comprises at least two parts, being applied to be vacuum-tight in the edge and/or abutting areas of the outer sides of the two panes 4 and 6 via the layer systems 7 using the metal solder material 5. The frame parts 13 are welded to be vacuum-tight to one another. The two panes 4 and 6 are spaced apart by spacers 9 with the space 10 between the panes 4 and 6 being evacuated.

Figure 12:
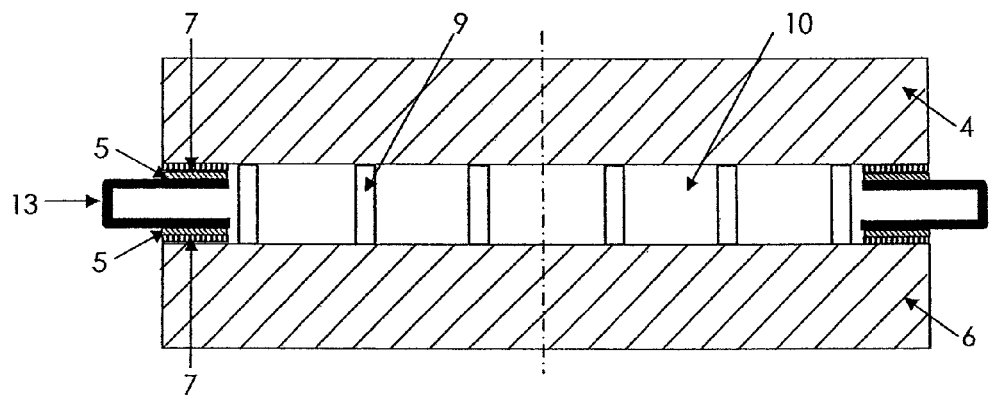

FIG. 12 shows a cross-sectional view comparable to that in FIG. 11 with a metal frame 13, which comprises at least one part, being applied to be vacuum-tight in the edge and/or abutting areas of the inner sides of the two panes 4 and 6 via the layer systems 7 using the metal solder material 5. If the frame comprises multiple parts, they are welded to one another to be vacuum-tight. The two layers 4 and 6 are spaced apart by spacers 9 with the space 10 between the panes 4 and 6 being evacuated.

Figure 13:
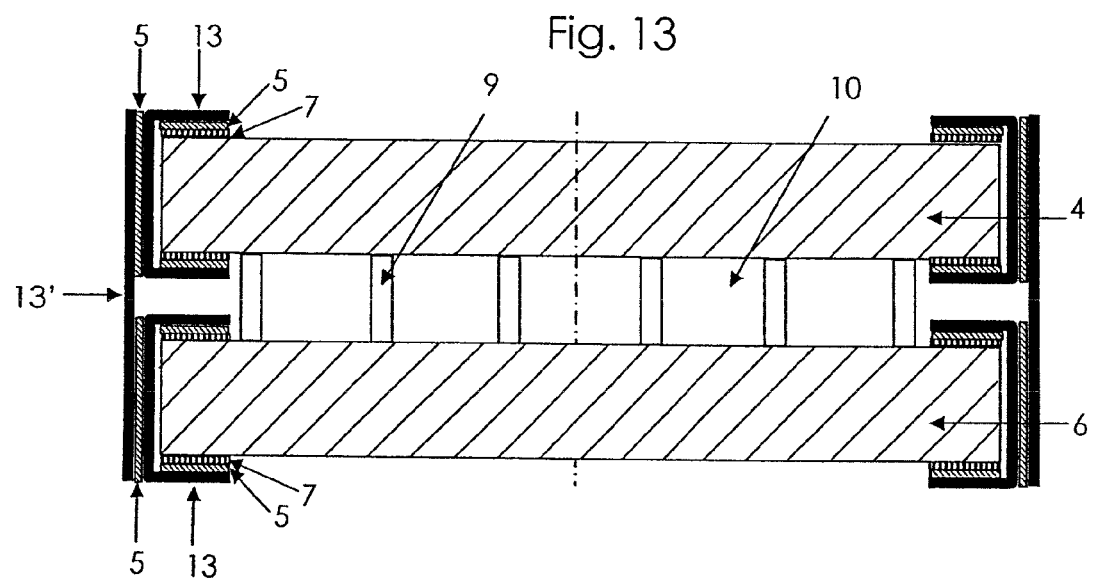

FIG. 13 shows a cross-sectional view of two glass panes 4, 6, which are spaced apart by spacers 9 with a metal frame 13, which comprises at least two parts, being applied to be vacuum-tight in the edge and/or abutting areas of the outer sides of the two panes 4 and 6 via the layer systems 7 using the metal solder material 5. The two metal frames 13 are each connected to one another to be vacuum-tight using an enveloping metal frame 13' via metal solder material. The two panes 4 and 6 are spaced apart by spacers 9 which the space 10 between the panes 4 and 6 being evacuated.

Figure 14:
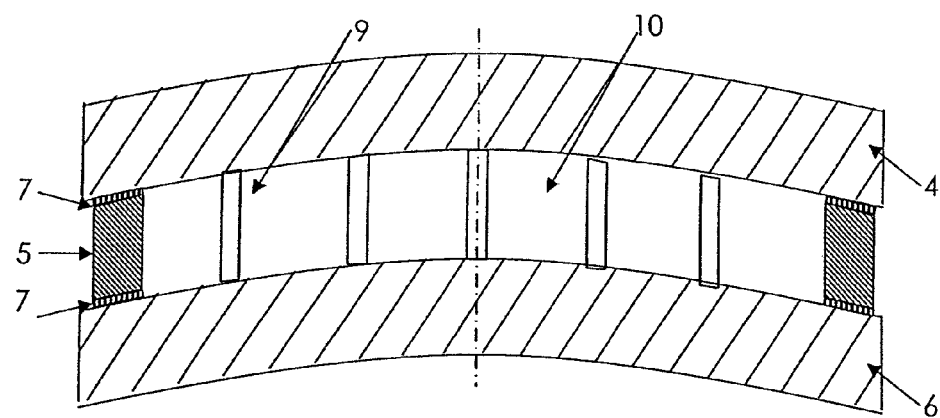

FIG. 14 shows a cross-sectional view of two curved glass panes 4, 6, which are spaced apart by spacers 9 with the edge composite being produced between at least one curved paned 4 and a further pane 6 oriented flatly thereto, as in one of previously described FIGS. 2-13.

Fundamentally, it is also possible to implement all planar glass panes shown in FIGS. 2 through 13 as curved, as shown in FIG. 14.

Figure 15:
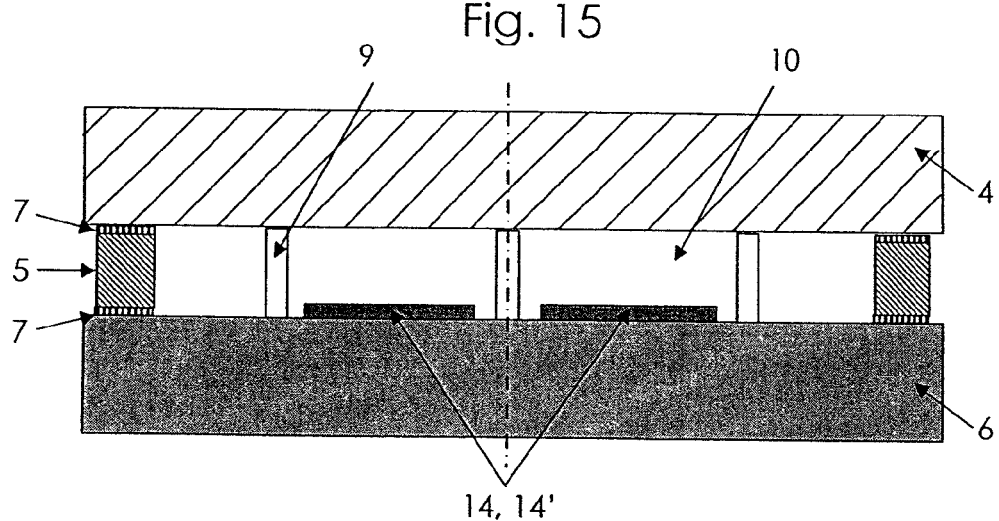

FIG. 15 shows a cross-sectional view of two glass panes 4, 6, which are spaced apart by spacers 9 with the edge composite between one pane 4 and a further join partner 6 oriented flatly thereto being produced as in one of previously described FIGS. 2-14. The composite system is used for the gas-tight housing of solar cells 14 and/or OLEDs 14'.

| LIST OF REFERENCE NUMERALS | |
|---|---|
| 1, 1' | adhesive layer |
| 2, 2' | solderable layer |
| 3, 3' | oxidation protective layer |
| 4 | component |
| 5 | solder material |
| 6 | component |
| 7, 7' | layer system |
| 8 | metal frame |
| 9 | spacer |
| 10 | volume |
| 11 | metal film |
| 12 | welded connection |
| 13, 13' | metal frame |
| 14, 14' | OLED, solar cell |

The invention claimed is:

1. A method for permanent connection of components, with at least one of the components including an electrically nonconductive material, comprising:
   soldering the components with solder containing metal by applying at least one layer including an adhesive layer ranging in thickness between 10 nm and approximately 200 nm to at least one of the components to provide adhesion, indirectly or directly to contact the at least one component with another component, heating the components to a soldering temperature characteristic for the solder material to provide a permanent soldered connection between the components after cooling, and wherein the adhesive layer providing adhesion comprises the adhesive layer applied directly to the at least one of the components and a solderable layer with the adhesive layer including at least one of oxides, carbides and nitrides.

2. A method in accordance with claim 1 wherein:
the soldering temperature is approximately 300° C.

3. A method in accordance with claim 1 wherein:
the adhesive layer comprises TiCN.

4. A method in accordance with claim 2 wherein:
the adhesive layer comprises TiCN.

5. A method in accordance with claim 1 wherein:
the adhesive layer comprises carbides.

6. A method in accordance with claim 2 wherein:
the adhesive layer comprises carbides.

7. A method in accordance with claim 3 wherein:
the adhesive layer comprises carbides.

8. A method in accordance with claim 4 wherein:
the adhesive layer comprises carbides.

* * * * *